United States Patent [19]

Scott

[11] Patent Number: 5,423,105
[45] Date of Patent: Jun. 13, 1995

[54] WINDSHIELD WIPER BLADE

[76] Inventor: Albert J. Scott, 448 Moredon Rd., Huntingdon Valley, Pa. 19006

[21] Appl. No.: 255,845

[22] Filed: Jun. 8, 1994

Related U.S. Application Data

[63] Continuation-in-part of Ser. No. 920,063, Jul. 27, 1992, abandoned.

[51] Int. Cl.[6] .................................................. B60S 1/38
[52] U.S. Cl. ................................. 15/250.4; 15/250.41; 15/250.36
[58] Field of Search ........... 15/250.41, 250.40, 250.47, 15/250.36, 245, 250.01, 250.02, 250.03, 250.04

[56] References Cited

U.S. PATENT DOCUMENTS

| | | | |
|---|---|---|---|
| D. 298,116 | 10/1988 | Sussich | D12/155 |
| D. 298,926 | 12/1988 | Rusnak | D12/155 |
| 1,597,999 | 8/1926 | Nilson et al. | 15/250.36 |
| 1,692,036 | 11/1928 | Hachenberg | 15/250.4 |
| 1,695,163 | 12/1928 | Truesdell et al. | 15/250.4 |
| 1,755,155 | 4/1930 | Storrie | 15/250.4 |
| 1,771,824 | 7/1930 | Storrie | 15/250.41 |
| 1,953,703 | 4/1934 | Dirienzo | 15/250.4 |
| 1,989,296 | 1/1935 | Smulski | 15/250.36 |
| 2,045,141 | 6/1936 | Horton et al. | 15/250.4 |
| 2,059,484 | 11/1936 | Paulus | 15/250.36 |
| 2,107,567 | 2/1938 | Grece | 15/250.4 |
| 2,179,451 | 11/1939 | Horton | 15/250.4 |
| 2,253,249 | 8/1941 | Peterson | 15/250.4 |
| 2,255,393 | 9/1941 | Osborn | 15/250.07 |
| 2,686,247 | 8/1954 | Curless, Jr. | 15/250.06 |
| 2,739,338 | 3/1956 | Weeks | 15/250.41 |
| 2,772,436 | 12/1956 | Deibel | 15/250.4 |
| 2,798,242 | 7/1957 | Zeininger et al. | 15/250.4 |
| 2,814,820 | 12/1957 | Elliott et al. | 15/250.42 |
| 2,834,976 | 5/1958 | Oishei | 15/250.4 |
| 2,865,040 | 12/1958 | Hamm | 15/250.09 |
| 2,908,028 | 10/1959 | Runton et al. | 15/250.36 |
| 3,006,016 | 10/1961 | Anderson | 15/250.36 |
| 3,084,372 | 4/1963 | Krohm | 15/250.36 |
| 3,116,510 | 1/1964 | Oishei et al. | 15/250.42 |
| 3,122,771 | 3/1964 | Dale | 15/250.36 |
| 3,386,123 | 6/1968 | Oishei et al. | 15/250.42 |
| 3,428,997 | 5/1969 | Rickett | 15/250.36 |
| 3,473,186 | 10/1969 | Mainka | 15/250.36 |
| 3,659,310 | 5/1972 | Rosen | 15/250.42 |
| 3,735,443 | 5/1973 | Deutscher et al. | 15/250.36 |
| 3,849,828 | 11/1974 | Cone | 15/250.42 |
| 3,866,262 | 2/1975 | Wubbe | 15/250.42 |
| 3,881,212 | 5/1975 | Regler | 15/250.04 |
| 3,903,560 | 9/1975 | Jewell et al. | 15/250.42 |
| 3,919,736 | 11/1975 | Bourassa et al. | 15/250.42 |
| 3,948,811 | 4/1976 | Clary et al. | 15/250.07 |
| 4,025,983 | 5/1977 | Schlegel | 15/250.36 |

(List continued on next page.)

FOREIGN PATENT DOCUMENTS

| | | | |
|---|---|---|---|
| 583367 | of 0000 | Germany | 15/250.41 |
| 2627832 | 1/1978 | Germany | 15/250.41 |
| 3205573 | 6/1983 | Germany | 15/250.41 |
| 0067650 | 4/1986 | Japan | 15/250.41 |

(List continued on next page.)

*Primary Examiner*—David A. Scherbel
*Assistant Examiner*—Gary K. Graham
*Attorney, Agent, or Firm*—Seidel Gonda Lavorgna Monaco

[57] ABSTRACT

A windshield wiper blade including a multi-level mount at one end and a multiple projection wiping element at the opposite end. The wiping end includes a base member extending perpendicularly on opposite sides of a center line. A projected central member extends from the base along the center line at a distance greater than the overall distance of the base member. On each side of the central projecting member, between the opposite sides of the base member, is provided an angled member which projects at a length from the intersection of the central member and the base members for a length approximately equal to the length of the base member. The angled member includes pointed elements which are formed by the angle of projection and a flat surface which is parallel to the base member and thus perpendicular to the center line. In addition, the angled member is tapered outwardly and joins an outward taper of the central projecting member.

8 Claims, 1 Drawing Sheet

U.S. PATENT DOCUMENTS

| | | | |
|---|---|---|---|
| 4,089,820 | 5/1978 | Wright | 260/5 |
| 4,317,251 | 3/1982 | Priesemuth | 15/250.41 |
| 4,339,839 | 7/1982 | Knights | 15/250.04 |
| 4,473,919 | 10/1984 | Fritz, Jr. | 15/250.4 |
| 4,524,481 | 6/1985 | Koomen | 15/250.41 |
| 4,543,682 | 10/1985 | Kessler et al. | 15/250.42 |
| 4,590,638 | 5/1986 | Beneteau | 15/250.42 |
| 4,622,712 | 11/1986 | Sugita et al. | 15/250.36 |
| 4,649,593 | 3/1987 | Gilliam, III et al. | 15/250.41 |
| 4,698,874 | 10/1987 | Fritz, Jr. | 15/250.33 |
| 4,700,425 | 10/1987 | Rusnak | 15/250.41 |
| 4,745,653 | 5/1988 | Bliznak | 15/250.04 |
| 4,912,803 | 4/1990 | Yosukawa et al. | 15/250.36 |
| 5,044,042 | 9/1991 | Stratton | 15/250.41 |
| 5,048,146 | 9/1991 | Cavenago | 15/250.36 |

FOREIGN PATENT DOCUMENTS

| | | | |
|---|---|---|---|
| 461560 | 2/1937 | United Kingdom | 15/250.41 |
| 821736 | 10/1959 | United Kingdom | 15/25.4 |
| 1269993 | 4/1972 | United Kingdom | 15/250.4 |
| 1460202 | 12/1976 | United Kingdom | 15/250.4 |

U.S. Patent  June 13, 1995  5,423,105
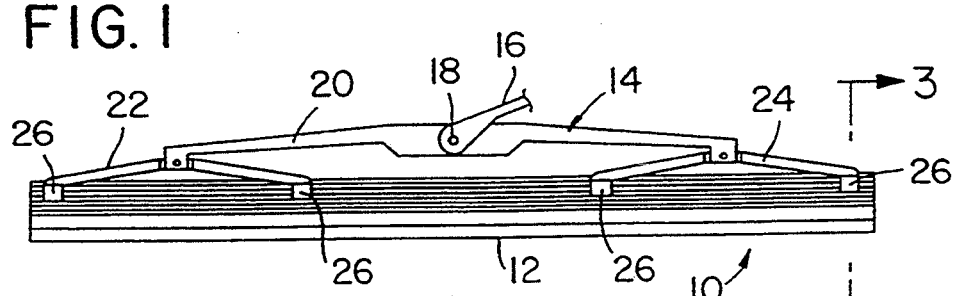
FIG. 1
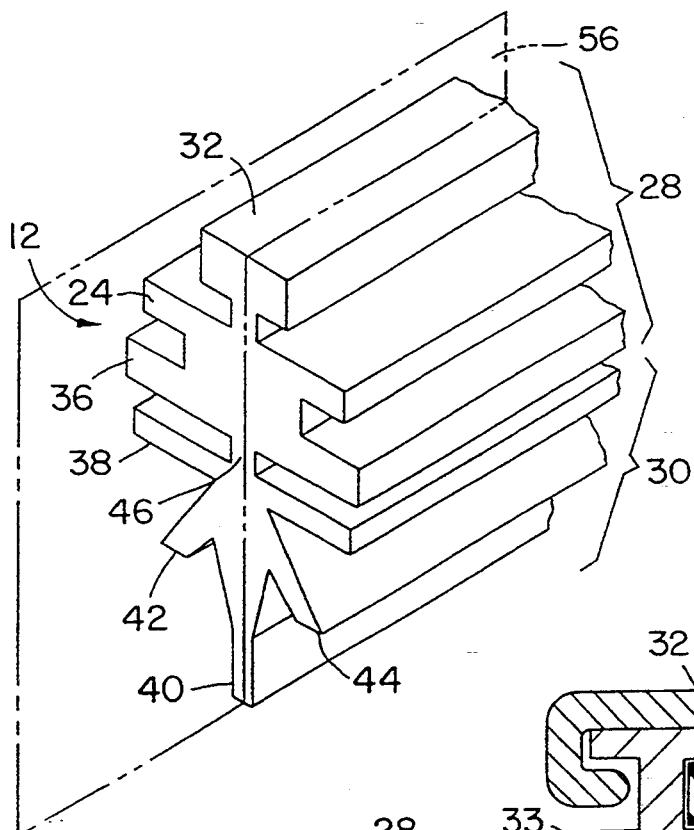
FIG. 2
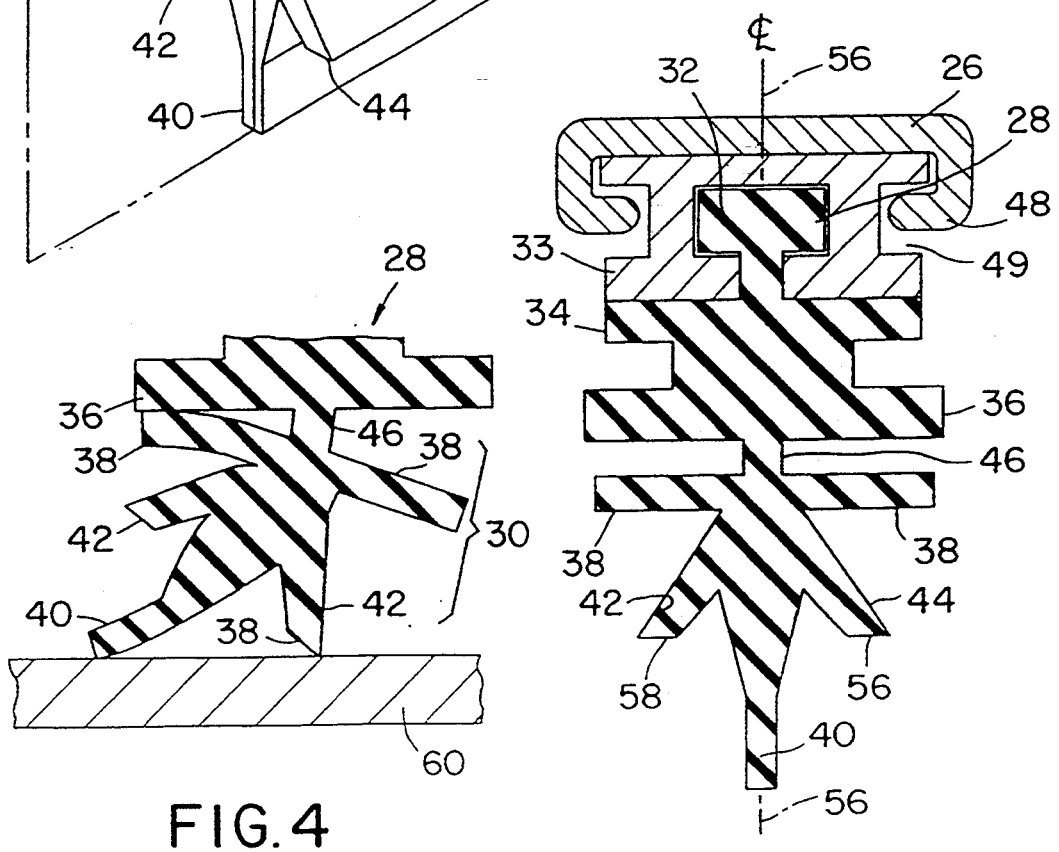
FIG. 4
FIG. 3

WINDSHIELD WIPER BLADE

This is a continuation-in-part of application Ser. No. 07/920,063, filed on Jul. 27, 1992 now abandoned.

FIELD OF THE INVENTION

The present invention relates to a windshield wiper blade for use on automobiles or the like to clear away snow, sleet, rain water or condensed moisture and the like from the vehicle windshield. The present invention includes a windshield wiper blade having multiple projections arranged in a specific format to create a desired wiping action.

SUMMARY OF THE INVENTION

The present invention comprises a molded windshield wiper preferably made of a NORDEL (trademark of E.I. DuPont de Nemours & Co.) material, coated with graphite so as to create a smooth wiping operation.

The preferred construction cross-section of the wiper blade includes a multi-level mount at one end and a multiple projection wiping element at the opposite end. The wiping end includes a base member extending perpendicular on opposite sides of a center line of the wiper blade cross-section. A projected central member extends from the base along the center line at a distance greater than the overall distance of the base member. On each side of the central projecting member, between the opposite sides of the base member, is provided an angled member which projects from its intersection with the central member and the base member for a distance approximately equal to the length of half the base member. The angled member includes pointed elements which are formed by the angle of projection and a flat surface which is parallel to the base member and thus perpendicular to the center line. In addition, the angled member is tapered outwardly and joins an outward taper of the central projecting member.

BRIEF DESCRIPTION OF THE DRAWINGS

For the purpose of illustrating the invention, there is shown in the drawings a form which is presently preferred,; it being understood, however, that this invention is not limited to the precise arrangements and instrumentalities shown.

FIG. 1 is a side elevational view of a windshield wiper blade incorporating a wiping element as contemplated by the preferred embodiment of the present invention.

FIG. 2 is a perspective view of the wiper element of the wiper blade shown in FIG. 1.

FIG. 3 is a cross-sectional view taken along line 3—3 in FIG. 1.

FIG. 4 is a cross-sectional view of the wiper blade of the present invention performing the wiping action in one direction.

DETAILED DESCRIPTION OF THE INVENTION

In the drawings, where like numerals indicate like elements, there is illustrated a windshield wiper mechanism which is generally designated by the numeral 10. The mechanism 10 as shown in FIG. 1 includes a wiper blade 12 which is supported by a carrier unit 14 which in turn is connected to the wiper arm 16. The wiper arm 16 (only a portion shown herein) is normally connected to a motor (not shown) which causes an oscillatory motion of the wiper blade 12 across the windshield (shown in FIG. 4). The wiper arm 16 is pivotally connected to the carrier unit 14 at a pin connection 18. The carrier unit 14 generally includes a main arm 20 connected at pin 18 to wiper arm 16 at its center. At opposite ends of the carrier unit 14 are provided secondary arms 22 and 24. Each secondary arm 22, 24 includes at opposite ends a grip element 26. The grip elements 26 engage the wiper blade 12 so as to support the blade 12 during the oscillatory motion of the wiper arm 16.

As specifically illustrated in FIG. 2, the wiper blade 12 includes a multi-level profile wherein each of the elements in the profile performs a specific function. The wiper blade 12 generally includes a head portion 28 and a wiping portion 30. The head portion forms a multi-level mount for the wiping portion 30. (The mounting of the wiper blade 12 will be discussed in more detail below.) The head portion 28 includes an upper head portion 32, a central head portion 34 and a lower head portion 36. The wiping portion generally 30 includes a base member 38, a central projecting member 40 and two angled members 42 and 44. Between the wiping portion 30 and the head portion 28 is provided a connecting flange 46. A center line or longitudinal plane 56 is shown in phantom.

The wiper blade 12 of the present invention is preferably made of a NORDEL material. NORDEL is a trademark of E.I. Dupont de Nemours & Company of Wilmington, Del. NORDEL is an elastomer material based upon an ethylene-propylene-hexadiene terpolymer which is sulfur curable. NORDEL typically has application to automotive and appliance components, wire insulation, electrical accessories, belts, hoses, and other mechanical products because of its overall strength. In the present invention, the use of NORDEL is contemplated to create durability for the wiping surface.

Additionally, the wiping portion 30 of the present invention is preferably coated with a graphite-type material so as to create a smooth wiping action. This combination of a graphite coated NORDEL wiper blade is contemplated to create a durable product that will not be affected by ozone, smog, heat or cold and will likely not rip or tear. In addition, the wiper blade 12 is preferably molded rather than extruded. These materials are the preferred construction, although other constructions would be contemplated.

In FIG. 3, there is illustrated in cross-section the engagement of the grip elements 26 on the head portion 28 of wiper blade 12 and showing the projection of the wiping portion 30 therefrom. The gripping portion 26 generally surrounds the upper portion 32 and engages a sleeve 33 which surrounds the upper head portion 32 of the head portion 28. The engagement of the grip elements 26 is made by inwardly projecting tabs 48 into channels 49 formed by the sleeve 33 which extend along the length of the wiper blade 12.

Projecting from the head portion 28 is the wiping portion 30 of the wiper blade 12. The connection between the wiping portion 30 and the head portion 28 is created by the connecting flange 46. This connecting flange 46 serves as a flexible pivot for the wiping portion 30 during the wiping action. Directly adjacent to the connecting flange 46 is the base member 38. The base member 38 extends perpendicularly from opposite sides of the center line 56 of the wiper blade 12. Extending from the base member 38 is the central projection 40 and the opposing angled members 42, 44. Angled member 42 joins with the base member 38 and projects a distance from the center line 56 less than that of the base member 38. The angled surface of the projection 42 terminates in a flat portion 58 forming a surface that is generally perpendicular to the center line 56. The flat surface 58 terminates in a second angled surface that is not parallel to the initial angled surface of angled member 42. Thus, the angled member 42 tapers outwardly as it approaches the center line 56 and the connection with base member 38. The central projection 40 preferably projects a distance from the head portion 28 that is approximately equal to the overall width of the base member 38. The central projection 40 includes a flat surface on its end and has a rectangular cross-section. The end portion extends inwardly to a tapered portion which serves to join with the opposing angled members 42, 44. The opposite angled member 44 is formed in a similar manner, only in mirror image, as angled member 42.

The preferred cross-section of the wiper blade 12 as illustrated in FIGS. 1-3 generally includes an upper head portion 32 being 1.3 centimeters in height and 2.6 centimeters in width. A connection member between the upper head portion 32 and the central head portion 34 is provided in a dimension of 0.8 centimeters in height and in width. The central portion 34 is also 0.8 centimeters in width and height and has an overall width of 6.1 centimeters. A connecting flange between the central head portion 34 and the lower head portion 36 has a height of 1.0 centimeter and a width of 3.5 centimeters. The lower head portion 34 has a height of 1.0 centimeter and a width of approximately 7.1 centimeters. The connecting flange 46 between the head portion 28 and the wiping portion 30 is preferably 0.7 centimeters in height and width. The base member 38 is preferably 0.7 centimeters in height and 6.0 centimeters in width. The extension of the central projecting member 40 from the base member 38 is approximately 5.4 centimeters. The flat surfaces 58 on the angled members 42, 44 are preferably 0.8 centimeters in length. These flat surfaces are positioned below the tip of the central projecting member 40 by 3.0 centimeters. The tip of the central projecting member 40 is 0.6 centimeters in width and 1.8 centimeters in length. The taper of the central projecting member 40 from its tip to the joint with the angled member is 2.1 centimeters in length. The taper of the central projecting member 40 increases the overall width of the member to approximately 1.6 centimeters. The wing span of the angled projecting members 42, 44 is 4.9 centimeters. The outside angled surface of the projecting members is at an angle with respect to the center line of 45°.

As illustrated in FIG. 4, the wiper blade 12 moves across a windshield 60 or the like witch an oscillatory motion caused by wiper arm 16 (FIG. 1). Because of the construction of the wiper blade 12, and particularly the wiping portion 30 thereof, an efficient wiping action is performed. The connecting flange 46 forms a flex or pivot for the wiping portion 30 with respect to the mounting or head portion 28. As the wiper blade 12 is caused to move across the windshield surface 60, the central projecting member 40 moves into contact with the surface along with one of the angled members 42. As illustrated in FIG. 4, the wiper blade 12 is moving from left to right. This motion causes the base member 38 to contact the lower head portion 36 on the left hand side thereof. The contact of the central projecting member 40 with the windshield surface 60 is such that the non-tapered portion thereof wipes across the windshield 60. In addition, the angled member 42 precedes the central projecting member 40. Thus, an initial wiping action is created by the angled member 42 and particularly by the point formed by the flat surface 58 and the outer angled surface thereof. The taper of the angled portion 42 maintains the contact as the wiper blade 12 moves across surface 60. The non-tapered portion of the central projecting member 40 permits the central projection to flex into contact with the surface of the windshield 60. Thus, two distinct types of contact are created by the central projecting member 40 and the angled portion 42. The wiping action in FIG. 4, as should be apparent, would be a mirror image of that shown, if the wiper blade 12 were moving from left to right as illustrated in FIG. 4.

The present invention may be embodied in other specific forms without departing from the spirit or essential attributes thereof, and accordingly, reference should be made to the appended claims, rather than to the foregoing specification, as indicating the scope of the invention.

I claim:

1. A wiper device for wiping translucent materials by an oscillatory motion, comprising: a longitudinally extending wiper blade having a mounting portion and a wiping portion, the wiping portion adapted for contacting the translucent materials during the oscillatory motion of the wiper blade, the wiping portion connected to the mounting portion by a longitudinally extending connecting flange, the connecting flange allowing flexible movement between the wiping and mounting portions during the oscillatory motion of the wiper blade, the wiping portion comprising a central projecting member, a base member and two angled members, the base member connected to and extending laterally from the connecting flange along the longitudinal length of the blade, the base member contacting the mounting portion during the oscillatory motion of the blade to limit the flexible movement between the mounting and wiping portions, the central projecting member extending along the longitudinal length of the blade, the central projecting member connected to and projecting perpendicularly from the base member to a projected end, the central projecting member tapered outwardly from the projected end towards its connection with the base member, the projected end of the central projecting member being rectangular in cross-section, the central projecting member being projected a distance from the base member that is greater than the overall lateral extension of the base member from its connection with the connecting flange, and the angled members extending longitudinally along the length of the blade on the opposite sides of the projection of the central projecting member, the angle member connected to and projecting from the central projecting member to project end, each forming an angled projection positioned between the projected end of the central projecting member and the base member and projecting at an angle of approximately 45° with respect to both the lateral extension of the base member and the projection of the central projecting member, the angled members tapering outwardly from their projected end towards their connection with the central projecting member and the base member such that the large end of the taper is juxtaposed to the large end of the taper of the central projecting member, the projected end of the central projecting member defines a flat surface and the projected end of each angled member therefore defines a flat surface parallel to the flat surface of the central projecting member and each angled member has an edge, wherein when the wiper flexes about the connecting flange the central projecting, member and the edge of one of the angled members engage the translucent material.

2. A wiper device as in claimed in claim 1 wherein the wiper blade is made of an ethylene-propylene-hexadiene terpolymer which is sulfur curable.

3. A wiper device as claimed in claim 2 wherein the wiper blade is molded.

4. A wiper device as claimed in claim 3 wherein the wiping portion is coated with a graphite material.

5. A wiper device for wiping a windshield by an oscillatory motion, comprising: a longitudinally extending wiper blade having a mourning portion and a wiping portion, the wiper blade symmetric about a longitudinal plane, the longitudinal plane bisects the mounting portion and the wiping portion, the wiping portion adapted for contacting the windshield during the oscillatory motion of the wiper blade, the wiping portion connected to the mounting portion by a longitudinally extending connecting flange bisected by the longitudinal plane, the connecting flange allowing flexible movement between the wiping and mounting portions during the oscillatory motion of the wiper blade, the wiping portion comprising a central projecting member, a base member and two angled members, the base member connected to the connecting flange and extending along the longitudinal length of the blade, perpendicular from the longitudinal plane, the base member contacting the mounting portion during the oscillatory motion of the blade to limit the flexible movement between the mounting and wiping portions, the central projecting member bisected by the longitudinal plane and extending along the longitudinal length of the blade, the central projecting member connected to and projecting perpendicularly from the base member to a projected end, the central projecting member tapered outwardly from the projected end towards its connection with the base member, the projected end of the central projecting member being rectangular in cross-section, the central projecting member being projected a distance from the base member that is greater than the overall lateral extension of the base member from the longitudinal plane, and the angled members extending longitudinally along: the length of the blade on the opposite sides of the projection of the central projecting member, the angle member connected to and projecting from the central projecting member to a projecting end, each forming an angled projection positioned between the projected end of the central projecting member and the base member and projecting at an angle of approximately 45° with respect to both the lateral extension of the base member and the projection of the central projecting member, the angled members tapering outwardly from their projected end towards their connection with the central projecting member and the base member such that the large end of the taper is juxtaposed to the large end of the taper of the central projecting member, the projected end of the central projecting member defines a flat surface perpendicular to the longitudinal plane and the projected end of the angled member therefore defines a flat surface parallel to the flat surface of the central projecting member and each angled member has an edge wherein when the wiper flexes about the connecting flange the central projecting member and the edge of one of the angled members engage the translucent material.

6. A wiper device as claimed in claim 5 wherein the wiper blade is made of an ethylene-propylene-hexadiene terpolymer which is sulfur curable.

7. A wiper device as claimed in claim 6 wherein the wiper blade is molded.

8. A wiper device as claimed in claim 7 wherein the wiping portion is coated with a graphite material.

* * * * *